United States Patent
Shen et al.

(10) Patent No.: US 10,735,981 B2
(45) Date of Patent: Aug. 4, 2020

(54) SYSTEM AND METHOD FOR PROVIDING A LAYER 2 FAST RE-SWITCH FOR A WIRELESS CONTROLLER

(71) Applicant: Cisco Technology, Inc., San Jose, CA (US)

(72) Inventors: Naiming Shen, Santa Clara, CA (US); Jun Zhuang, Menlo Park, CA (US); Laxmikantha Reddy Ponnuru, Santa Clara, CA (US); Veeranjaneyulu Pendyala, Sunnyvale, CA (US)

(73) Assignee: Cisco Technology, Inc., San Jose, CA (US)

(*) Notice: Subject to any disclaimer, the term of this patent is extended or adjusted under 35 U.S.C. 154(b) by 236 days.

(21) Appl. No.: 15/728,559

(22) Filed: Oct. 10, 2017

(65) Prior Publication Data
US 2019/0110214 A1  Apr. 11, 2019

(51) Int. Cl.
| | | |
|---|---|---|
| H04W 24/04 | (2009.01) | |
| H04L 29/12 | (2006.01) | |
| H04L 12/24 | (2006.01) | |
| H04L 12/931 | (2013.01) | |
| H04W 76/12 | (2018.01) | |
| H04W 40/24 | (2009.01) | |
| H04L 12/723 | (2013.01) | |

(Continued)

(52) U.S. Cl.
CPC .......... *H04W 24/04* (2013.01); *H04L 12/462* (2013.01); *H04L 12/4633* (2013.01); *H04L 41/0686* (2013.01); *H04L 45/50* (2013.01); *H04L 45/66* (2013.01); *H04L 49/65* (2013.01); *H04L 61/103* (2013.01); *H04W 40/24* (2013.01); *H04W 76/12* (2018.02); *H04L 61/6022* (2013.01); *H04W 76/32* (2018.02)

(58) Field of Classification Search
CPC ........ H04B 10/035; H04L 45/22; H04L 45/28
See application file for complete search history.

(56) References Cited

U.S. PATENT DOCUMENTS

| | | |
|---|---|---|
| 4,236,068 A | 11/1980 | Walton |
| 5,642,303 A | 6/1997 | Small et al. |

(Continued)

FOREIGN PATENT DOCUMENTS

| | | |
|---|---|---|
| WO | WO 2013/020126 | 2/2013 |
| WO | WO 2014/098556 | 6/2014 |
| WO | WO 2018/009340 | 1/2018 |

OTHER PUBLICATIONS

International Search Report and Written Opinion from the International Searching Authority, dated Jan. 29, 2019, 11 pages, for corresponding International Patent Application No. PCT/US2018/055175.

(Continued)

*Primary Examiner* — Redentor Pasia
(74) *Attorney, Agent, or Firm* — Polsinelli PC (57) ABSTRACT

Disclosed is a method that includes receiving, at a layer 2 switch, a first message to establish a fast re-switch tunnel between the layer 2 switch and a standby wireless controller and receiving, at the layer 2 switch, a second message to trigger use of the fast re-switch tunnel. The switch receives data and forwards the data to the standby wireless controller through the fast re-switch tunnel. Once MAC tables are updated for the standby wireless controller, the fast re-switch tunnel can be torn down.

20 Claims, 8 Drawing Sheets

(51) Int. Cl.
*H04L 12/46* (2006.01)
*H04L 12/721* (2013.01)
*H04W 76/32* (2018.01)

(56) References Cited

U.S. PATENT DOCUMENTS

| | | | |
|---|---|---|---|
| 5,751,223 | A | 5/1998 | Turner |
| 6,812,824 | B1 | 11/2004 | Goldinger et al. |
| D552,603 | S | 10/2007 | Tierney |
| 7,573,862 | B2 | 8/2009 | Chambers et al. |
| D637,569 | S | 5/2011 | Desai et al. |
| 7,975,262 | B2 | 7/2011 | Cozmei |
| 8,010,079 | B2 | 8/2011 | Mia et al. |
| 8,102,814 | B2 | 1/2012 | Rahman et al. |
| 8,260,320 | B2 | 9/2012 | Herz |
| 8,284,748 | B2 | 10/2012 | Borghei |
| 8,300,594 | B1 | 10/2012 | Bernier et al. |
| 8,325,626 | B2 | 12/2012 | Tóth et al. |
| 8,396,485 | B2 | 3/2013 | Grainger et al. |
| 8,446,899 | B2 | 5/2013 | Lei et al. |
| 8,458,184 | B2 | 6/2013 | Dorogusker et al. |
| D691,636 | S | 10/2013 | Bunton |
| 8,549,638 | B2 | 10/2013 | Aziz |
| 8,644,301 | B2 | 2/2014 | Tamhankar et al. |
| 8,650,279 | B2 | 2/2014 | Mehta et al. |
| 8,669,902 | B2 | 3/2014 | Pandey et al. |
| 8,676,182 | B2 | 3/2014 | Bell et al. |
| 8,682,279 | B2 | 3/2014 | Rudolf et al. |
| 8,693,367 | B2 | 4/2014 | Chowdhury et al. |
| 8,718,644 | B2 | 5/2014 | Thomas et al. |
| 8,768,389 | B2 | 7/2014 | Nenner et al. |
| 8,849,283 | B2 | 9/2014 | Rudolf et al. |
| 8,909,698 | B2 | 12/2014 | Parmar et al. |
| 8,958,318 | B1 | 2/2015 | Hastwell et al. |
| 9,038,151 | B1 * | 5/2015 | Chua ............... H04L 45/02 709/223 |
| 9,060,352 | B2 | 6/2015 | Chan et al. |
| 9,130,859 | B1 | 9/2015 | Knappe |
| 9,173,084 | B1 | 10/2015 | Foskett |
| 9,173,158 | B2 | 10/2015 | Varma |
| D744,464 | S | 12/2015 | Snyder et al. |
| D757,424 | S | 5/2016 | Phillips et al. |
| D759,639 | S | 6/2016 | Moon et al. |
| 9,389,992 | B2 | 7/2016 | Gataullin et al. |
| 9,426,305 | B2 | 8/2016 | De Foy et al. |
| D767,548 | S | 9/2016 | Snyder et al. |
| D776,634 | S | 1/2017 | Lee et al. |
| 9,544,337 | B2 | 1/2017 | Eswara et al. |
| 9,609,504 | B2 | 3/2017 | Karlqvist et al. |
| 9,642,167 | B1 | 5/2017 | Snyder et al. |
| 9,654,344 | B2 | 5/2017 | Chan et al. |
| 9,713,114 | B2 | 7/2017 | Yu |
| 9,772,927 | B2 | 9/2017 | Gounares et al. |
| 9,820,105 | B2 | 11/2017 | Snyder et al. |
| D804,450 | S | 12/2017 | Speil et al. |
| 9,858,559 | B2 | 1/2018 | Raleigh et al. |
| 9,860,151 | B2 | 1/2018 | Ganichev et al. |
| 9,923,780 | B2 | 3/2018 | Rao et al. |
| 9,933,224 | B2 | 4/2018 | Dorne et al. |
| 9,967,906 | B2 | 5/2018 | Verkaik et al. |
| 9,980,220 | B2 | 5/2018 | Snyder et al. |
| 9,985,837 | B2 | 5/2018 | Rao et al. |
| 10,110,684 | B1 * | 10/2018 | Haltore ............... H04L 67/16 |
| 2003/0087645 | A1 | 5/2003 | Kim et al. |
| 2003/0116634 | A1 | 6/2003 | Tanaka |
| 2004/0203572 | A1 | 10/2004 | Aerrabotu et al. |
| 2005/0090225 | A1 | 4/2005 | Muehleisen et al. |
| 2005/0169193 | A1 | 8/2005 | Black et al. |
| 2005/0186904 | A1 | 8/2005 | Kowalski et al. |
| 2006/0022815 | A1 | 2/2006 | Fischer et al. |
| 2006/0030290 | A1 | 2/2006 | Rudolf et al. |
| 2006/0092964 | A1 | 5/2006 | Park et al. |
| 2006/0126882 | A1 | 6/2006 | Deng et al. |
| 2006/0187866 | A1 | 8/2006 | Werb et al. |
| 2007/0037605 | A1 | 2/2007 | Logan |
| 2007/0206537 | A1 | 9/2007 | Cam-Winget et al. |
| 2007/0239854 | A1 | 10/2007 | Janakiraman et al. |
| 2008/0037715 | A1 | 2/2008 | Prozeniuk et al. |
| 2008/0084888 | A1 | 4/2008 | Yadav et al. |
| 2008/0101381 | A1 | 5/2008 | Sun et al. |
| 2008/0163207 | A1 | 7/2008 | Reumann et al. |
| 2008/0233969 | A1 | 9/2008 | Mergen |
| 2009/0129389 | A1 | 5/2009 | Halna DeFretay et al. |
| 2009/0203370 | A1 | 8/2009 | Giles et al. |
| 2009/0282048 | A1 | 11/2009 | Ransom et al. |
| 2009/0298511 | A1 | 12/2009 | Paulson |
| 2009/0307485 | A1 | 12/2009 | Weniger et al. |
| 2010/0039280 | A1 | 2/2010 | Holm et al. |
| 2010/0097969 | A1 | 4/2010 | De Kimpe et al. |
| 2011/0087799 | A1 | 4/2011 | Padhye et al. |
| 2011/0142053 | A1 | 6/2011 | Van Der Merwe et al. |
| 2011/0182295 | A1 | 7/2011 | Singh et al. |
| 2011/0194553 | A1 | 8/2011 | Sahin et al. |
| 2011/0228779 | A1 | 9/2011 | Goergen |
| 2011/0274036 | A1 | 11/2011 | Calhoun et al. |
| 2012/0023552 | A1 | 1/2012 | Brown et al. |
| 2012/0054367 | A1 | 3/2012 | Ramakrishnan et al. |
| 2012/0088476 | A1 | 4/2012 | Greenfield |
| 2012/0115512 | A1 | 5/2012 | Grainger et al. |
| 2012/0157126 | A1 | 6/2012 | Rekimoto |
| 2012/0167207 | A1 | 6/2012 | Beckley et al. |
| 2012/0182147 | A1 | 7/2012 | Forster |
| 2012/0311127 | A1 | 12/2012 | Kandula et al. |
| 2012/0324035 | A1 | 12/2012 | Cantu et al. |
| 2013/0029685 | A1 | 1/2013 | Moshfeghi |
| 2013/0039391 | A1 | 2/2013 | Skarp |
| 2013/0057435 | A1 | 3/2013 | Kim |
| 2013/0077612 | A1 | 3/2013 | Khorami |
| 2013/0088983 | A1 | 4/2013 | Pragada et al. |
| 2013/0107853 | A1 | 5/2013 | Pettus et al. |
| 2013/0108263 | A1 | 5/2013 | Srinivas et al. |
| 2013/0115916 | A1 | 5/2013 | Herz |
| 2013/0145008 | A1 | 6/2013 | Kannan et al. |
| 2013/0155906 | A1 | 6/2013 | Nachum et al. |
| 2013/0191567 | A1 | 7/2013 | Rofougaran et al. |
| 2013/0203445 | A1 | 8/2013 | Grainger et al. |
| 2013/0217332 | A1 | 8/2013 | Altman et al. |
| 2013/0232433 | A1 | 9/2013 | Krajec et al. |
| 2013/0273938 | A1 | 10/2013 | Ng et al. |
| 2013/0317944 | A1 | 11/2013 | Huang et al. |
| 2013/0322438 | A1 | 12/2013 | Gospodarek et al. |
| 2013/0343198 | A1 | 12/2013 | Chhabra et al. |
| 2013/0347103 | A1 | 12/2013 | Veteikis et al. |
| 2014/0007089 | A1 | 1/2014 | Bosch et al. |
| 2014/0016926 | A1 | 1/2014 | Soto et al. |
| 2014/0025770 | A1 | 1/2014 | Warfield et al. |
| 2014/0052508 | A1 | 2/2014 | Pandey et al. |
| 2014/0059655 | A1 | 2/2014 | Beckley et al. |
| 2014/0087693 | A1 | 3/2014 | Walby et al. |
| 2014/0105213 | A1 | 4/2014 | Keshava et al. |
| 2014/0118113 | A1 | 5/2014 | Kaushik et al. |
| 2014/0148196 | A1 | 5/2014 | Bassan-Eskenazi et al. |
| 2014/0179352 | A1 | 6/2014 | V.M. et al. |
| 2014/0191868 | A1 | 7/2014 | Ortiz et al. |
| 2014/0198808 | A1 | 7/2014 | Zhou |
| 2014/0233460 | A1 | 8/2014 | Pettus et al. |
| 2014/0269321 | A1 | 9/2014 | Kamble et al. |
| 2014/0269535 | A1 | 9/2014 | Pazhyannur et al. |
| 2014/0302869 | A1 | 10/2014 | Rosenbaum et al. |
| 2014/0337824 | A1 | 11/2014 | St. John et al. |
| 2014/0341568 | A1 | 11/2014 | Zhang et al. |
| 2015/0016286 | A1 | 1/2015 | Ganichev et al. |
| 2015/0016469 | A1 | 1/2015 | Ganichev et al. |
| 2015/0030024 | A1 | 1/2015 | Venkataswami et al. |
| 2015/0043581 | A1 | 2/2015 | Devireddy et al. |
| 2015/0063166 | A1 | 3/2015 | Sif et al. |
| 2015/0065161 | A1 | 3/2015 | Ganesh et al. |
| 2015/0087330 | A1 | 3/2015 | Prechner et al. |
| 2015/0103818 | A1 | 4/2015 | Kuhn et al. |
| 2015/0163192 | A1 | 6/2015 | Jain et al. |
| 2015/0172391 | A1 | 6/2015 | Kasslin et al. |
| 2015/0223337 | A1 | 8/2015 | Steinmacher-Burow |
| 2015/0256972 | A1 | 9/2015 | Markhovsky et al. |
| 2015/0264519 | A1 | 9/2015 | Mirzaei et al. |

(56) References Cited

U.S. PATENT DOCUMENTS

| | | | |
|---|---|---|---|
| 2015/0280827 A1 | 10/2015 | Adiletta et al. | |
| 2015/0288410 A1 | 10/2015 | Adiletta et al. | |
| 2015/0312140 A1* | 10/2015 | Yang | H04L 12/1863 370/218 |
| 2015/0326704 A1 | 11/2015 | Ko et al. | |
| 2015/0358777 A1 | 12/2015 | Gupta | |
| 2015/0362581 A1 | 12/2015 | Friedman et al. | |
| 2016/0007315 A1 | 1/2016 | Lundgreen et al. | |
| 2016/0044627 A1 | 2/2016 | Aggarwal et al. | |
| 2016/0099847 A1 | 4/2016 | Melander et al. | |
| 2016/0105408 A1 | 4/2016 | Cooper et al. | |
| 2016/0127875 A1 | 5/2016 | Zampini, II | |
| 2016/0146495 A1 | 5/2016 | Malve et al. | |
| 2016/0165463 A1* | 6/2016 | Zhang | H04L 43/10 370/218 |
| 2016/0344641 A1 | 11/2016 | Javidi et al. | |
| 2017/0026974 A1 | 1/2017 | Dey et al. | |
| 2017/0214551 A1 | 7/2017 | Chan et al. | |
| 2018/0069311 A1 | 3/2018 | Pallas et al. | |
| 2018/0084389 A1 | 3/2018 | Snyder et al. | |

OTHER PUBLICATIONS

Afolabi, Ibrahim, et al., "Network Slicing & Softwarization: A Survey on Principles, Enabling Technologies & Solutions," Mar. 21, 2018, pp. 1-24.
Antonioli, Roberto, et al., "Dual Connectivity for LTE-NR Cellular Networks," Research Gate, Sep. 3-6, 2017, pp. 171-175.
Cisco ASR 5x00 Mobility Management Entity Administration Guide, Version 15.0, Last updated Jun. 13, 2014, Cisco, 1-266.
Cox, Jacob H. Jr., et al., "Advancing Software-Defined Networks: A Survey," IEEE, Oct. 12, 2017, pp. 25487-25526.
Saraiva de Sousa, Nathan F., et al., "Network Service Orchestration: A Survey," IEEE Communications Surveys & Tutorials, Mar. 23, 2018, pp. 1-30.
Geller, Michael, et al. , "5G Security Innovation with Cisco," Whitepaper Cisco Public, Jun. 8, 2018, pp. 1-29.
Ventre, Pier Luigi, et al., "Performance Evaluation and Tuning of Virtual Infrastructure Managers for (Micro) Virtual Network Functions," ieee.org, Nov. 7-10, 2016, pp. 1-7.
"I Love WiFi, The difference between L2 and L3 Roaming Events," Apr. 1, 2010, 6 pages.
Carter, Steve Sr., "E911 VoIP Essentials for Enterprise Deployments," XO Communications, LLC, 2012, 9 pages.
Chalise, Batu K., et al., "MIMO Relaying for Multiaccess Communication in Cellular Networks," Sensor Array and MultiChannel Signal Processing Workshop, 2008, SAM 2008, 5th IEEE, Jul. 21, 2008, pp. 146-150.
Cisco Systems, Inc., "Wi-FI Location-Based Services 4.1 Design Guide," May 20, 2008, 206 pages.
Cui, Wenzhi et al., "DiFS: Distributed Flow Scheduling for Data Center Networks," Nanjing University, China, Jul. 28, 2013, 10 pages.
Galvan T., Carlos E., et al., "Wifi bluetooth based combined positioning algorithm," International Meeting of Electrical Engineering Research ENIINVIE 2012, Procedia Engineering 35 (2012 ), pp. 101-108.
Gesbert, David, "Advances in Multiuser MIMO Systems (Tutorial Part II) Emerging Topics in Multiuser MIMO Networks," IEEE PIMRC Conference, Sep. 2007, 107 pages.
Halperin, Daniel, et al., "Augmenting Data Center Networks with Multi-Gigabit Wireless Links," Aug. 15-19, 2011, SIGCOMM'11, ACM 978-1-4503-0797-0/11/08, pp. 38-49.
Ji, Philip N., et al., "Demonstration of High-Speed MIMO OFDM Flexible Bandwidth Data Center Network," Optical Society of America, 2012, 2 pages.
Kandula, Srikanth, et al., "Flyways to De-Congest Data Center Networks," Microsoft Research, Oct. 23, 2009, 6 pages.
Katayama, Y. et al., "MIMO Link Design Strategy for Wireless Data Center Applications," IEEE Wireless Communications and Networking Conference: Services, Applications, and Business, 2012, 5 pages.
Leary, Jonathan, et al., "Wireless LAN Fundamentals: Mobility," Jan. 9, 2004, Cisco Press, 15 pages.
Network Heresy, "NVGRE, VXLAN and What Microsoft is Doing Right," Oct. 3, 2011, 5 pages.
Savvides, Andreas, et al., "Dynamic Fine-Grained Localization in Ad-Hoc Networks of Sensors", Proceeding MobiCom '01 Proceedings of the 7th annual international conference on Mobile computing and networking, Jul. 2001, pp. 166-179.

* cited by examiner

SYSTEM AND METHOD FOR PROVIDING A LAYER 2 FAST RE-SWITCH FOR A WIRELESS CONTROLLER

TECHNICAL FIELD

The present disclosure relates to pack flow through a wireless controller and more specifically to a layer 2 fast re-switching approach which provides a process of transitioning from an active wireless controller to a standby wireless controller when the active wireless controller fails.

BACKGROUND

Figure 1:
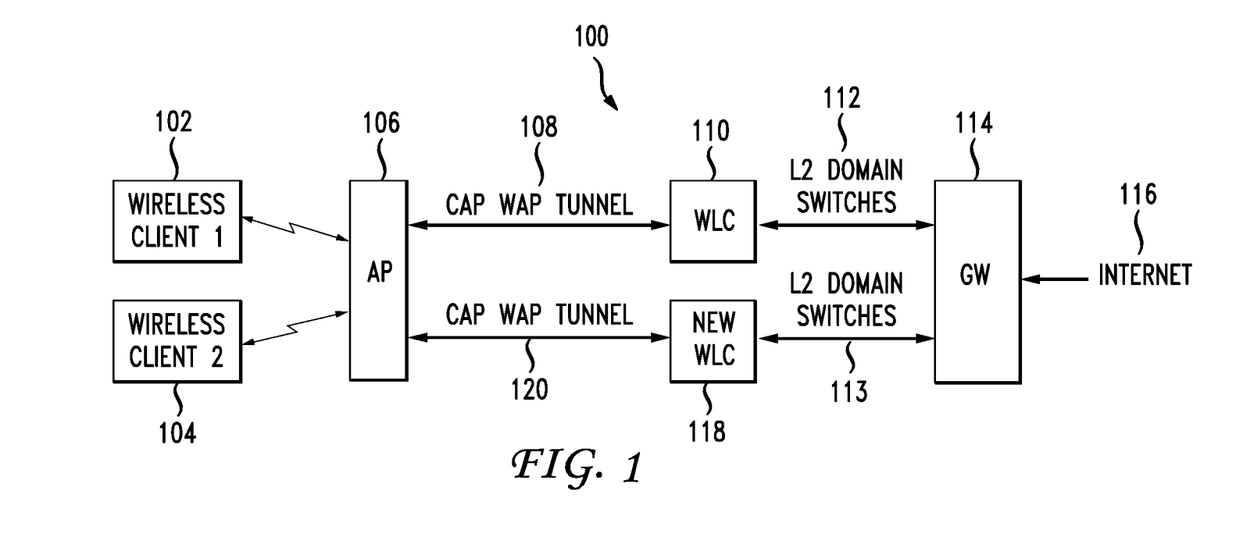
FIG. 1 illustrates an example wireless packet flow through various devices between a wireless client and the Internet.

FIG. 1 illustrates the general wireless packet flow infrastructure 100 between wireless devices 102, 104 and the Internet 116. Clients 102,104 connect to an Access Point (AP) 106 wherein data will be transmitted through an IP CAPWAP (Wireless Access Points protocol) tunnel 108 to a wireless controller (WLC) 110. Packets will then be natively layer 2 (L2) forwarded 112, 113 to/from Internet gateway (GW) router 114 for connecting to the Internet 116.

A WLC 110 can handle hundreds of thousands of wireless clients 102/104. The WLC 110 needs to be highly redundant with high availability. When the active WLC 110 goes down, a standby WLC 118 takes over. The wireless clients 102/104 and the AP 106 states are synced over from the active WLC 110 to the standby WLC 118. The AP 106 also needs to switch to the new active WLC 118 with a new CAPWAP tunnel end-point 120. After the WLC fail-over, the clients 102/104 to/from the WLC portion of the traffic is handled in a fast convergence fashion such that within one second, for example, the traffic from the clients 102/104 is communicated from the AP 106 through the new tunnel 120 to the new WLC 118. The AP 106 can represent multiple devices and even hundreds to thousands of devices.

However, there are additional challenges in the failover process. The portion of the network between the WLC 110 and the GW 114 is a L2 switch or switch domain 112, 113. For traffic from the GW 114 to the WLC 110, the MAC (Media Access Control) learning had the path from the GW 114 to the former active WLC device 110. The L2 switch network 112 will not know that the new active WLC 118 has taken over all the client MAC addresses. The challenge in the fail-over scenario is that it takes real traffic for each of the MAC addresses of the clients 102/104 to be relearned in order for GW 114 to reach the new active WLC device 118.

One way to handle relearning all of the MAC addresses after a fail-over to the new active WLC 118. The new active WLC 118 will send out gratuitous ARP (Address Resolution Protocol) signals for each of the clients 102/104 to advertise that the new WLC 118 now owns those MAC addresses. But to handle hundreds of thousands of wireless client MAC devices, at the moment right after switchover and the device is very busy, would take a while for all MAC addresses to be finally relearned in the L2 domain 113.

Thus, even if the system implements an efficient and speedy synchronization of the clients' information from the active WLC 110 to the standby WLC 118, if the system does not implement a scalable solution to deal with the re-convergence of hundreds of thousands of wireless clients on the L2 domain, there remains a need within the art for a faster convergence approach.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed is a method that enables a transition from a primary active wireless controller to a standby wireless controller. The method includes establishing a fast re-switch tunnel between a L2 switch and the standby wireless controller. Once the tunnel is established, the system can switch from the active wireless controller to the standby wireless controller and data can be routed from the Internet through the layer to switching network to the standby wireless controller through the fast re-switch tunnel prior to updating MAC tables for wireless clients. The method from the standpoint of the L2 switch includes receiving, at the L2 switch, a first message to establish a fast re-switch tunnel between the L2 switch and a wireless controller and receiving, at the L2 switch, a second message to trigger use of the fast re-switch tunnel. The switch receives data and forwards the data to the standby wireless controller through the fast re-switch tunnel.

The standby wireless controller, once it becomes active, can transmit a gratuitous address resolution protocol request to the wireless clients such that all of the MAC entries for wireless clients in a table can be updated. Once all the MAC entries are updated, the fast re-switch tunnel can be removed. Embodiments of the concepts disclosed herein can be directed to different nodes within the environment. For example, aspects of the disclosure can be addressed from the standpoint of an L2 switch in layer 2, which can include any switch and including the switch closest to the active wireless controller. The disclosure can be addressed from the standpoint of the active wireless controller or the standby wireless controller. Furthermore, the disclosure can be directed from the standpoint of a gateway node, an access point, a wireless client, or any other component which is involved in the management of the pathways associated with data flow through the layer 2 network.

Detailed Description

The present disclosure addresses the issues raised above. The disclosure provides a system, method and computer-readable storage device embodiments. First a general example system shall be disclosed in FIG. 2 which can provide some basic hardware components making up a server, node or other computer system.

Figure 2:
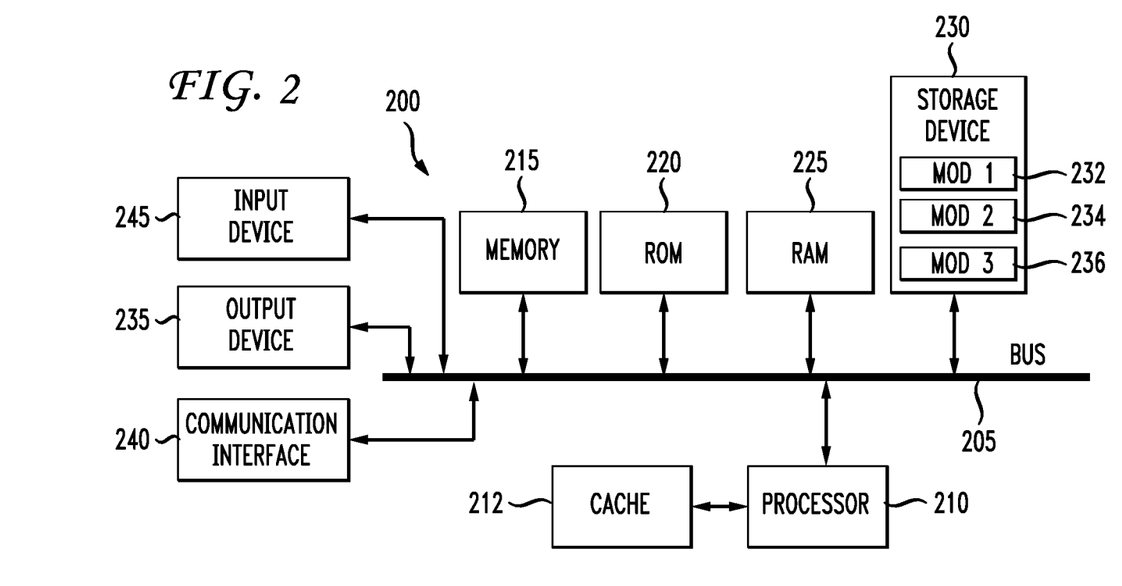
FIG. 2 illustrates an example system configuration.

First a general example system shall be disclosed in FIG. 2, which can provide some basic hardware components making up a server, node or other computer system. FIG. 2 illustrates a computing system architecture 200 wherein the components of the system are in electrical communication with each other using a connector 205. Exemplary system 200 includes a processing unit (CPU or processor) 210 and a system connector 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules/services can control or be configured to control the processor 210 to perform various actions. Other system memory 215 may be available for use as well. The memory 215 can include multiple different types of memory with different performance characteristics. The processor 210 can include any general purpose processor and a hardware module or software module/service, such as service 1 232, service 2 234, and service 3 236 stored in storage device 230, configured to control the processor 210 as well as a special-purpose processor where software instructions are incorporated into the actual processor design. The processor 210 may essentially be a completely self-contained computing system, containing multiple cores or processors, a bus (connector), memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software services 232, 234, 236 for controlling the processor 210. Other hardware or software modules/services are contemplated. The storage device 230 can be connected to the system connector 205. In one aspect, a hardware module that performs a particular function can include the software component stored in a computer-readable medium in connection with the necessary hardware components, such as the processor 210, connector 205, display 235, and so forth, to carry out the function.

According to an aspect of this disclosure, the Active/Standby WLC interface 110 is with the Internet Gateway (GW) 114 in the layer 2 (L2) domain 112. This part is not an IP/IPv6 network. The GW 114 treats the WLC 110 as part of the switch domain. The virtual router redundancy protocol, which provides for automatic assignment of available Internet Protocol routers for participating hosts, does not apply in this case. The L2 domain switches 112 in this disclosure relate to the OSI L2 switch routing functionality. The basic idea is to use controller intelligence design routes through an Ethernet switched network that avoid the use of broadcast when the route to the destination is known. L2 is the data link layer that provides node-to-node data transfer. It is a link between two directly connected nodes, which, in this case, is the Gateway 114 and the WLC 110 or WLC 118. The data link L2, in one application, is divided into two sub layers, including the MAC layer which is responsible for controlling how devices in a network gain access to a medium and permission to transmit data and a logical link control layer, which is responsible for identifying and encapsulating network layer protocols, and controls error checking and frame synchronization.

Figure 3A:
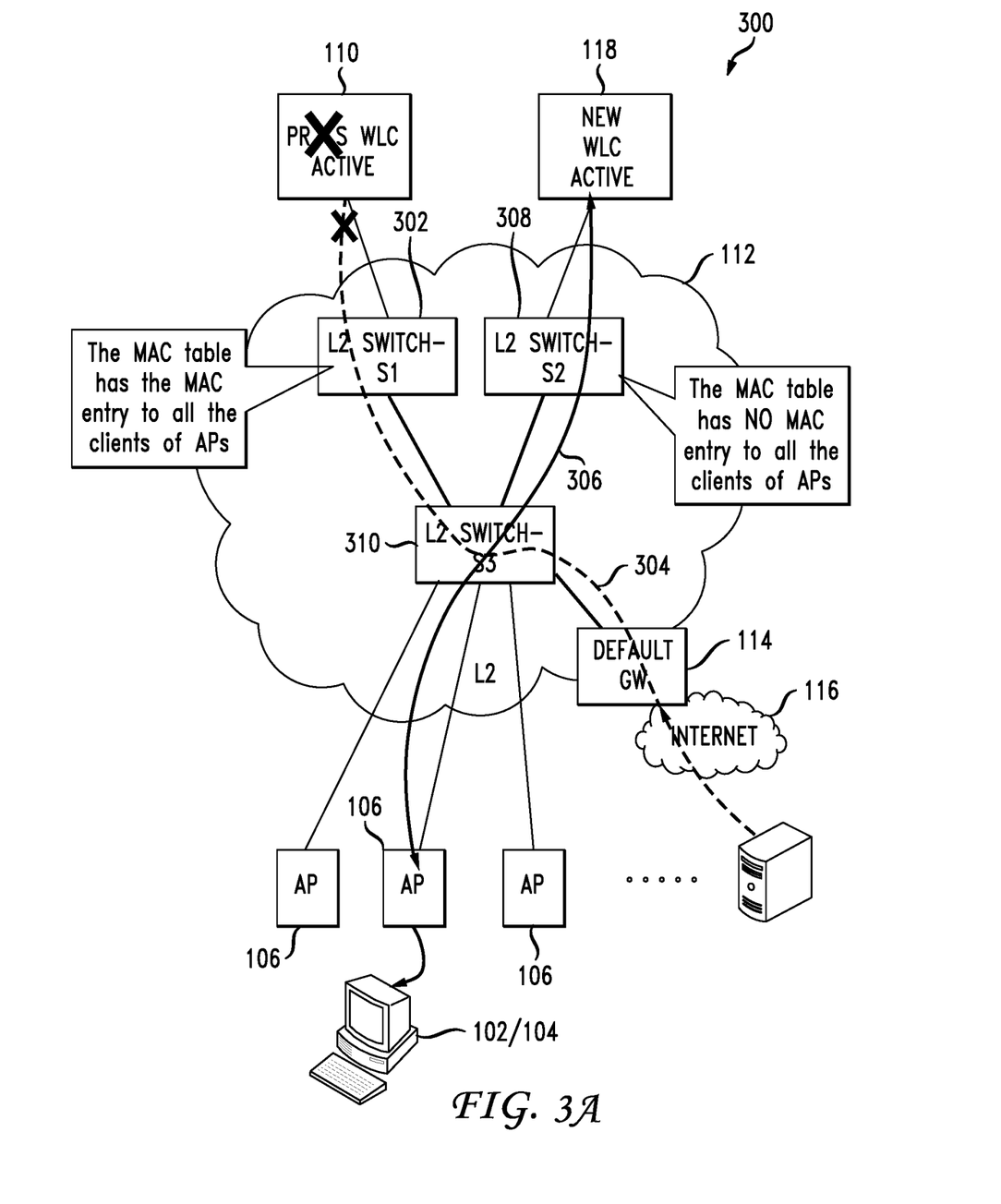
FIG. 3A illustrates a first aspect of the fast re-switch approach.
Figure 3B:
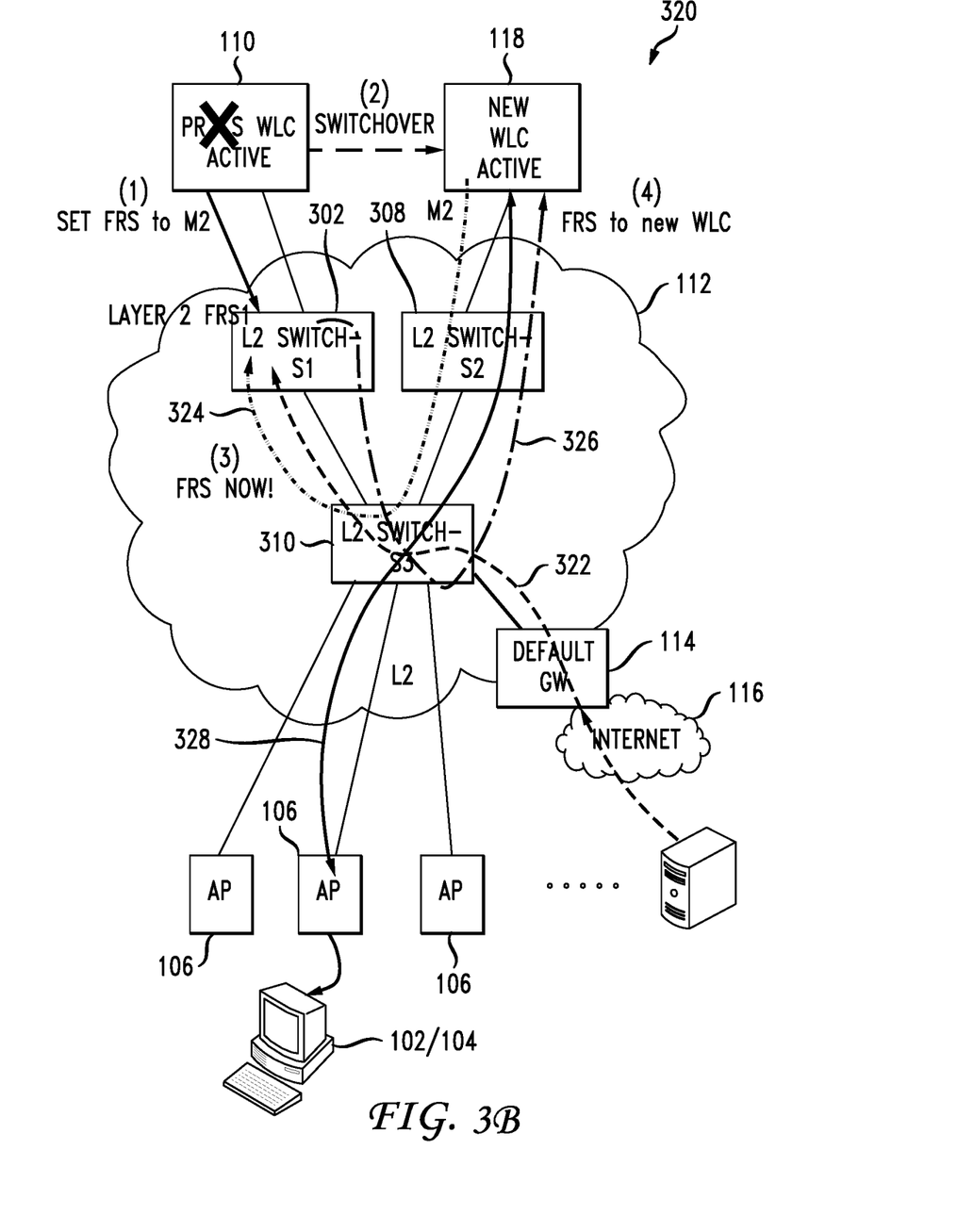
FIG. 3B illustrates another aspect of the fast re-switch approach.
Figure 3C:
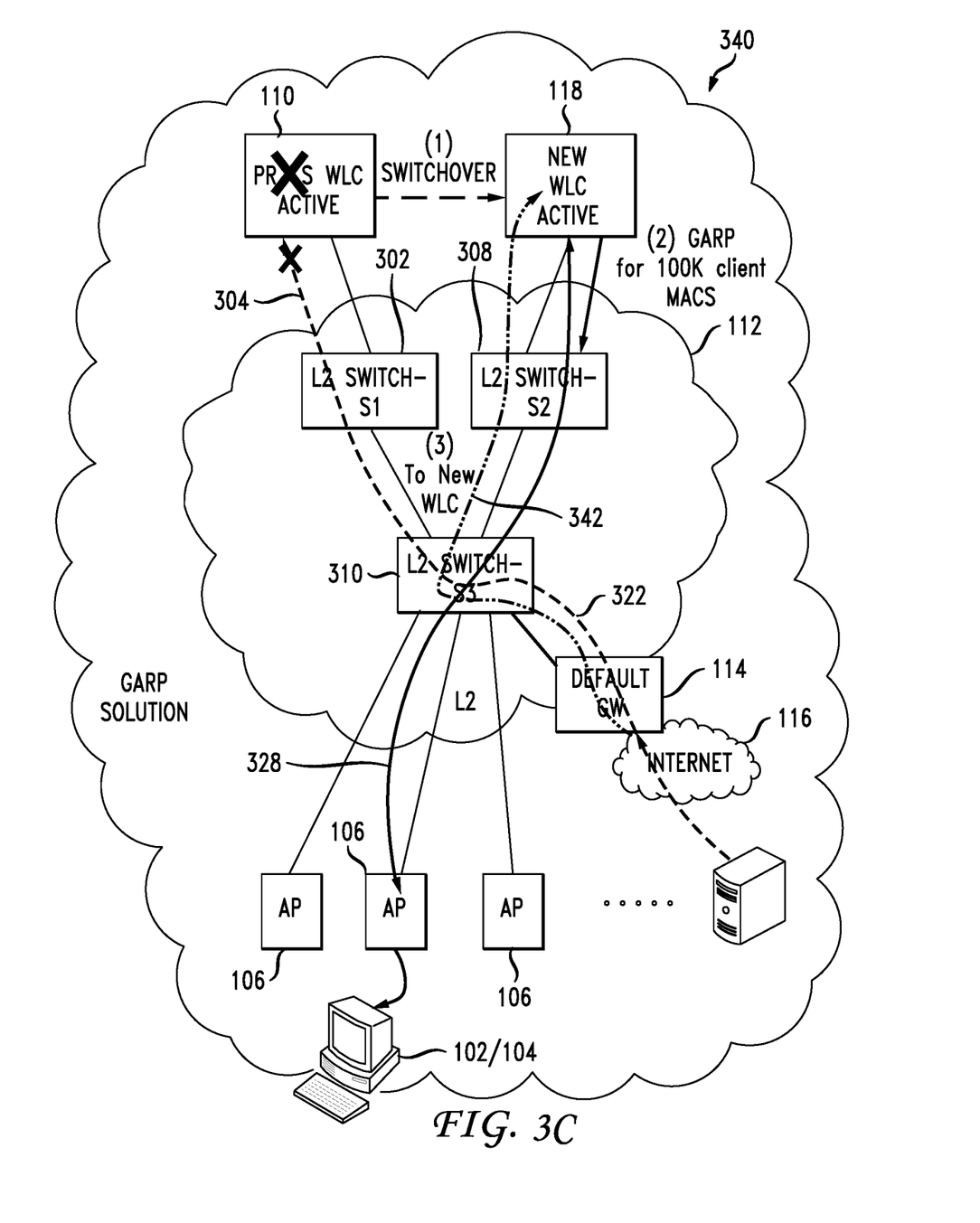
FIG. 3C illustrates yet another aspect of the fast re-switch approach.
Figure 4:
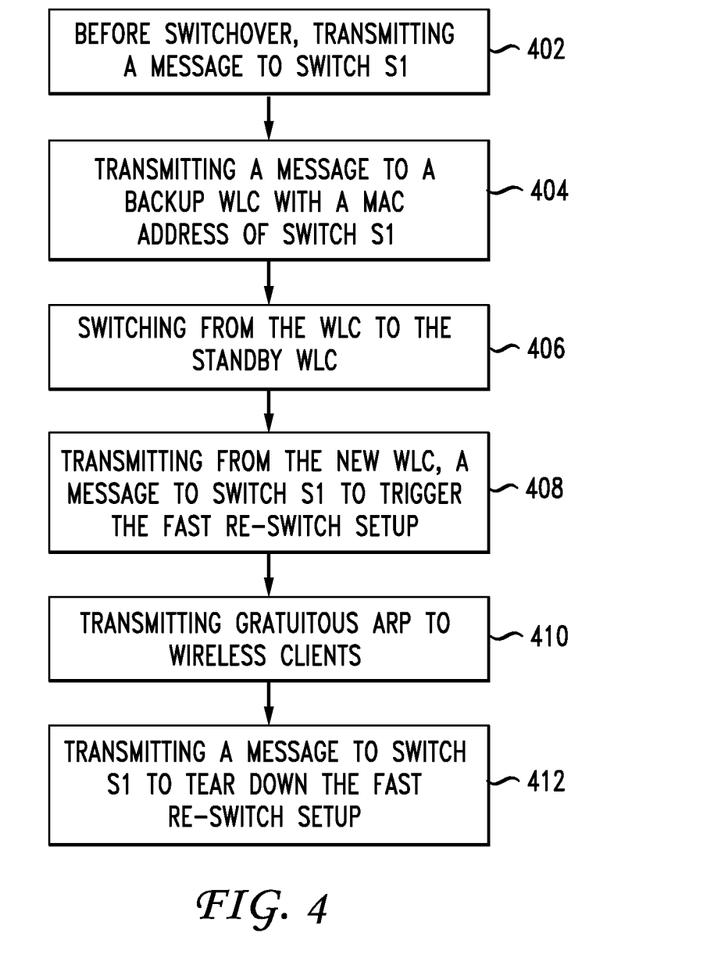
FIG. 4 illustrates a method embodiment.

FIGS. 3A, 3B and 3C illustrate an example network architecture 300 according to an aspect of this disclosure. FIG. 4 illustrates a method embodiment. These figures will be discussed together with the following example.

In FIG. 3A, the traffic 304 from the Internet to the wireless clients 102/104 stops at the L2 switch 'S1' 302 after a failure of the WLC 110. If this traffic can be re-switched towards the new active WLC 118, then the blackholing before the re-convergence of the L2 network can be minimized.

As shown in FIG. 3B, before a switch-over from an active WLC 110 the new WLC 118, the active WLC 110 sends a signal/message to a switch 'S1' 302 (402). The switch 302 can be directly connected to the WLC 110, or may be any other switch in layer 2 that can be configured with this functionality. The path 304 prior to switchover as is shown in FIG. 3A from the Internet 116, through the GW 114, through L2 Switch S3 310, through L2 Switch S1 302 to the WLC 110. Switch S1 has a MAC table with all of the entries for all the clients 102/104 of the APs 106. The message instructs the switch S1 302 to setup a backup path to MAC address 'M2' (the MAC address of the new WLC 118) for all the traffic that comes to the WLC 110. The MAC address 'M2' is the MAC address of the standby WLC interface 118 connecting to the L2 switch domain 112. The active WLC 110 can learn the M2 MAC address for the standby the WLC 118 from the standby the WLC 118 since the active WLC 110 and the standby the WLC 118 synchronize the wireless client 102/104 and AP 106 states. The active WLC 110 also instructs the standby WLC 118 that the fast re-switch point of local repair (PLR) is 'S1' 302 (with MAC address 'M3', for example) (404).

The signal or message can be a L2 packet, for example use the CMP (Cisco MetaData Protocol) in the similar way as a security group tag (SGT) tag is defined. The switch 'S1' 302 is the only L2 device that needs to support the functionality disclosed herein. When 'S1' 302 receives the signal/message from the WLC 110, the switch S1 302 sets up the forwarding chain such that the normal traffic for all the WLC 110 related MAC addresses will go to the port towards the current active WLC 110, and the standby forwarding will have a MAC over MAC tunnel to reach the destination MAC of 'M2' (at the new WLC 118) for the fast re-switch later. In FIG. 3B, the data on pathway 322 from the Internet 116, through the GW 114, and L2 switch S3 310 flows to L2 Switch S1 and then is tunneled 326 (as triggered by the steps outline in the next paragraph) through L2 Switch S3 and L2 Switch S2 to the new WLC 118. This process basically involves pre-setting up a tunnel to the M2 address such that if the link goes down to WLC 110, the L2 Switch S1 302 can send the traffic that used to be sent to WLC 110 over to WLC 118 at MAC address M2. Any communications, handshakes, confirmations, and so forth can be established during this stage to acknowledge that WLC 118 is willing to accept traffic originally intended for WLC 110.

Next the process includes switching over from the WLC 110 to the stand-by WLC 118 (406). The new active WLC 118 knows that it is now the master and will send a L2 signal/message 324 to switch 'S1' 302 (using MAC 'M3', for example) which instructs the switch S1 302 to trigger the fast re-switch setup such that traffic flows 326 to 'M2' now (408). The pre-setup was established above, and this step involves activating or triggering the fast re-switch setup which causes the traffic to utilize the new path to the WLC 118. There can be any amount of time before the pre-setup and the actual triggering. Furthermore, the timing of the instruction to pre-set up the tunnel and the triggering can be determined based on a number of factors. For example, WLC 110 may predict that within one hour, there is a likelihood that it will fail. WLC 110 can, based on the prediction of the timing of when a failure is likely, or based on any other factor, can transmit the signal to S1 302 to initiate the pre-set up. Other factors outside of the WLC 110 can be communicated to the WLC 110 such that it sends the instruction. The instruction can also come from another source and not the WLC 110. Another node in the network, and administrator, a network-based service, and so forth, could cause the instruction to be sent to S1 302 to initiate the preset up process.

The 'S1' 302, based on the message from the new WLC 118, flips the forwarding active/standby path decision on the forwarding chain 326. The result of this operation is that all the traffic that was to be sent to the port for the previous WLC 110 is now encapsulated with another MAC tunnel 326 with destination address of MAC 'M2' 118. Since the new active WLC 118 sends a L2 signal 324 to 'S1' 302 for triggering, the MAC 'M2' is learned throughout the L2 domain from the new active WLC 118 to 'S1' 302.

All the traffic from the Internet 116 to respective wireless clients 102/104, if the traffic reaches the switch 'S1', will be fast re-switched 326 to the new active WLC 118. It will be further sent to the AP 106 and clients 102/104 by the WLC 118 via path 328.

In the meantime, the new active WLC 118 can send out gratuitous address resolution protocol (GARP) signals for all of its wireless clients 102/104 (410). This is shown in FIG. 3C. This process may take 10 minutes to complete, but it is needed to have traffic eventually go through the optimal path 342 in the L2 network. Note that after the GARP, that L2 Switch S1 302 is bypassed in the path of traffic to the new WLC 118. After all the MAC addresses are processed with the GARP, the new active WLC 118 can send another signal/message to 'S1' (MAC 'M3' for example) to have it tear down the fast re-switch setup and to remove this state from the switch (412). This signal to tear down the tunnel that was created by S1 302 can also come from any other node in the network.

The L2 fast re-switch approach works in a general L2 switch network and does not depend on the network topology. Even when the 'S1' and 'S2' switches represent a single combined switch, the mechanism works the same without change.

A more secure and reliable mechanism can add a 'keepalive' message (once every 5 minutes for example) between the 'S1' Switch 302 and the standby WLC 118 after step (402) above. This is to make sure the standby WLC 118 will accept the tunneled-over traffic after switch-over, and also to make sure the path between them is not broken before the switch-over happens.

Multicast traffic from the Internet 116 to the clients 102/104 will be handled the same way during the fast re-switch. Normally after switch-over to the new active WLC 118, multicast traffic needs to wait until the client sending out the periodical Internet group management protocol (IGMP) reports which is once a minute by default. With this L2 fast re-switching, the multicast packets received on 'S1' 302 will be MAC encapsulated to the new active WLC 118 to reach the wireless clients 102/104. The L2 fast re-switch can be applied to some use cases other than the WLC high availability. The mechanism can be standardized for multiple vendor support.

The fast re-switching approach disclosed herein is the industry's first L2 fast re-switch for the application of wireless controller high availability. It uses a MAC over MAC tunnel to achieve the fast convergence in a scalable way after the WLC switchover in the L2 switch domain between the WLC 110/118 and Internet gateway router 114.

The L2 solution is simple and effective, and can scale to a very large number of clients of a wireless controller with the same fast convergence time. Only one external device to the WLC 110 needs to support this mechanism and rest of the L2 domain does not need to understand this feature. In the example above, a directly connected L2 switch 302 is the supporting device, but other layer 2 switches or any other node could be used as well. It does not have the problem of long delay by only sending out gratuitous ARP for relearning of MAC addresses in L2 domain. The approach is not restricted to switches and topology as in using the Virtual Switching System (VSS) switches with dual active/standby links. The approach also does not need to run a border gateway protocol (BGP) Ethernet virtual private network/locator identify separation protocol (EVPN/LISP) complex overlay protocol mechanism. Further, the approach does not need to flushout the MAC addresses as in overlay transport virtualization (OTV) case then to relearn every one of them.

This disclosure realizes that the L2 switch domain cannot relearn a large of the MAC addresses very fast (e.g. <1 sec) and the system needs to use the concept of IP network's fast reroute (FRR) which is independent of number of route entries. The concept disclosed herein is an L2 fast re-switch approach which takes certain steps to more efficiently manage a switch over from one WLC 110 to another WLC 118.

Embodiments of the concepts disclosed herein can be claim from the standpoint of different nodes within the environment. For example, aspects of the disclosure can be addressed from the standpoint of an L2 switch in layer 2, which can include any switch and includes the L2 switch 302 as the closest switch to the active wireless controller 110. The disclosure can be addressed from the standpoint of the active wireless controller 110 or the standby wireless controller 118. Furthermore, the disclosure can be directed from the standpoint of a gateway node 114, an access point 106, a wireless client 102/104, or any other component which is involved in the management of the pathways associated with dataflow through the layer 2 network.

Figure 5:
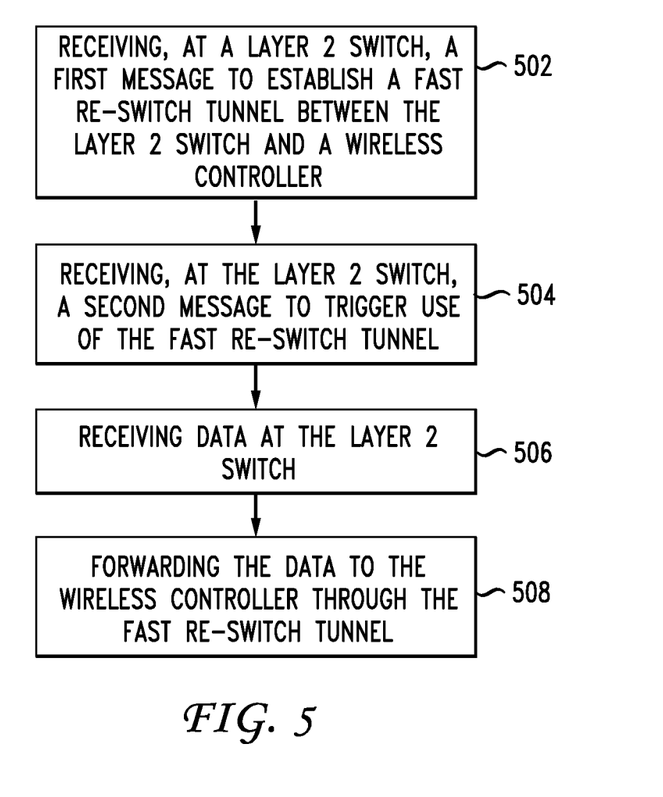
FIG. 5 illustrates a method embodiment from a switch standpoint.

FIG. 5 illustrates an aspect of this disclosure from the standpoint of an L2 switch. The L2 switch 302 is preferably, the L2 switch that is nearest physically or virtually to the active WLC 110, although it could also be any switch in the layer. The method includes receiving, at a L2 switch, a first message to establish a fast re-switch tunnel between the L2 switch and a wireless controller (502), receiving, at the L2 switch, a second message to trigger use of the fast re-switch tunnel (504), receiving data at the L2 switch (506) and forwarding the data to the wireless controller through the fast re-switch tunnel (508).

The L2 switch can receive the first message from a first wireless controller or from any other node within the network. The wireless controller can be a second wireless controller that is different from the first wireless controller. In one example, the second wireless controller is the standby or backup wireless controller 118 and the first wireless controller can be the active wireless controller 110. The method can further include receiving, at the L2 switch, a MAC address of the wireless controller. This of course enables the set up of the fast re-switch tunnel 326, which can occur prior to a switchover to the standby WLC 118.

The method can also include receiving, at the L2 switch 302, a third message instructing the L2 switch 302 to tear down the fast re-switch tunnel 326. This message can be received after a completion of a gratuitous address resolution protocol transmission process associated with the wireless controller. The GARP process involves the slower process of updating MAC tables for all of the wireless clients 102/104 being served by the standby WLC 118.

Figure 6:
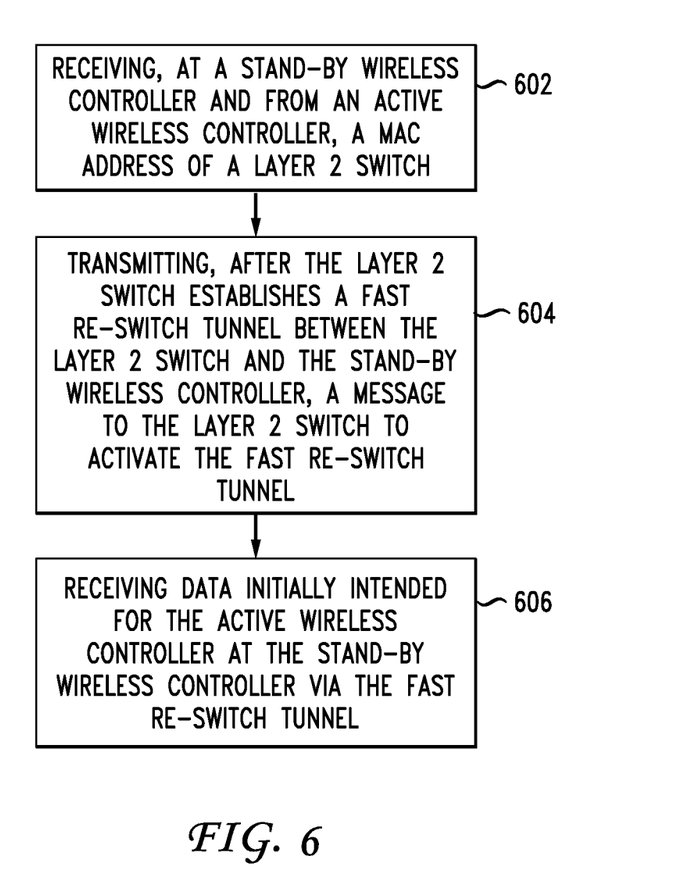
FIG. 6 illustrates a method embodiment from a wireless controller standpoint.

FIG. 6 illustrates an embodiment from the standpoint of the standby wireless controller 118. The method includes receiving, at a stand-by wireless controller and from an active wireless controller, a MAC address of a L2 switch (602), transmitting, after the L2 switch establishes a fast re-switch tunnel between the L2 switch and the stand-by wireless controller, after controller fail-over and after the stand-by controller becomes the active controller (or one or more of these events), a message to the L2 switch to activate the fast re-switch tunnel (604) and receiving data initially intended for the active wireless controller at the stand-by wireless controller via the fast re-switch tunnel (606). The method can further include transmitting a gratuitous address resolution protocol notice to clients of the stand-by wireless controller. After a completion of a process of filling a MAC table with entries for the clients based on transmitting the gratuitous address resolution protocol notice, the method can include transmitting a second message to the L2 switch to tear down the fast re-switch tunnel. Another aspect can include receiving additional data at the stand-by wireless controller after the fast re-switch tunnel is torn down.

In some embodiments the computer-readable storage devices, mediums, and/or memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   first receiving, at a stand-by wireless controller and from an active wireless controller, a MAC address of a layer 2 switch;
   first transmitting, after the layer 2 switch establishes a fast re-switch tunnel between the layer 2 switch and the stand-by wireless controller, a message to the layer 2 switch to activate the fast re-switch tunnel;
   second receiving data initially intended for the active wireless controller at the stand-by wireless controller via the fast re-switch tunnel; and
   second transmitting, after the second receiving, a second message to the layer 2 switch to tear down the fast re-switch tunnel.

2. The method of claim 1, further comprising:
   third transmitting a gratuitous address resolution protocol notice to clients of the stand-by wireless controller.

3. The method of claim 2, wherein the second transmitting occurs after a completion of a process of filling a MAC table with entries for clients based on transmitting the gratuitous address resolution protocol notice.

4. The method of claim 3, further comprising:
   third receiving additional data at the stand-by wireless controller after the fast re-switch tunnel is torn down.

5. The method of claim 1, wherein the first transmitting of the message to the layer 2 switch to activate the fast re-switch tunnel occurs after the active wireless controller ceases working.

6. The method of claim 1, further comprising:
   switching data flow from the active wireless controller to the stand-by wireless controller.

7. The method of claim 1, wherein the data is received from a gateway to the layer 2 switch.

8. The method of claim 1, further comprising:
   fourth receiving additional data at the stand-by wireless controller after MAC entries for clients of access points associated with the stand-by wireless controller are complete and after the fast re-switch tunnel is torn down.

9. A wireless controller, comprising:
   a non-transitory computer readable memory storing instructions;
   a processor programmed to cooperate with the instructions in memory to perform operations comprising:
      first receiving, from an active wireless controller, a MAC address of a layer 2 switch;
      first transmitting, after the layer 2 switch establishes a fast re-switch tunnel between the layer 2 switch and the wireless controller, a message to the layer 2 switch to activate the fast re-switch tunnel;
      second receiving data initially intended for the active wireless controller via the fast re-switch tunnel; and
      second transmitting, after the first receiving, a second message to the layer 2 switch to tear down the fast re-switch tunnel.

10. The wireless controller of claim 9, the operations further comprising:
    third transmitting a gratuitous address resolution protocol notice to clients of the wireless controller.

11. The wireless controller of claim 10, wherein the second transmitting occurs after a completion of a process of filling a MAC table with entries for clients based on transmitting the gratuitous address resolution protocol notice.

12. The wireless controller of claim 11, the operations further comprising:
    third receiving additional data at the wireless controller after the fast re-switch tunnel is torn down.

13. The wireless controller of claim 9, wherein the first transmitting of the message to the layer 2 switch to activate the fast re-switch tunnel occurs after the active wireless controller ceases working.

14. The wireless controller of claim 9, the operations further comprising:
    fourth receiving additional data at the wireless controller after MAC entries for clients of access points associated with the wireless controller are complete and after the fast re-switch tunnel is torn down.

15. A non-transitory computer readable media storing instructions which when executed by a system cause the system to perform operations comprising:
    first receiving, at a stand-by wireless controller from an active wireless controller, a MAC address of a layer 2 switch;
    first transmitting, after the layer 2 switch establishes a fast re-switch tunnel between the layer 2 switch and the stand-by wireless controller, a message to the layer 2 switch to activate the fast re-switch tunnel;
    second receiving data initially intended for the active wireless controller at the stand-by wireless controller via the fast re-switch tunnel; and
    second transmitting, after the first receiving, a second message to the layer 2 switch to tear down the fast re-switch tunnel.

16. The non-transitory computer readable media of claim 15 the operations further comprising:
    third transmitting a gratuitous address resolution protocol notice to clients of the stand-by wireless controller.

17. The non-transitory computer readable media of claim 16, wherein the second transmitting occurs after a completion of a process of filling a MAC table with entries for clients based on transmitting the gratuitous address resolution protocol notice.

18. The non-transitory computer readable media of claim 17, the operations further comprising:
  third receiving additional data at the stand-by wireless controller after the fast re-switch tunnel is torn down.

19. The non-transitory computer readable media of claim 15, wherein the first transmitting of the message to the layer 2 switch to activate the fast re-switch tunnel occurs after the active wireless controller ceases working.

20. The non-transitory computer readable media of claim 15, the operations further comprising:
  fourth receiving additional data at the stand-by wireless controller after MAC entries for clients of access points associated with the stand-by wireless controller are complete and after the fast re-switch tunnel is torn down.

* * * * *